July 20, 1948.    I. SAKS    2,445,638
FRICTION CLUTCH
Filed Nov. 3, 1944
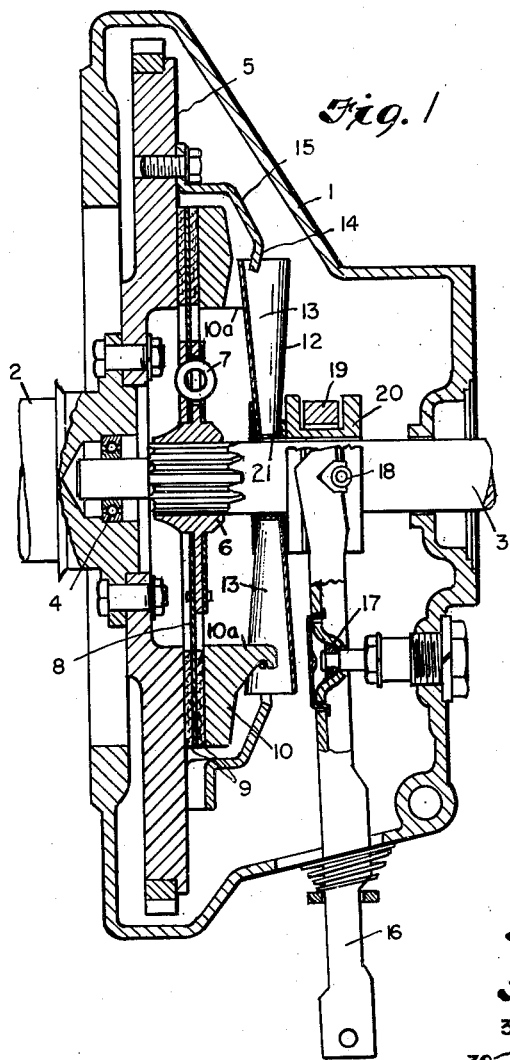
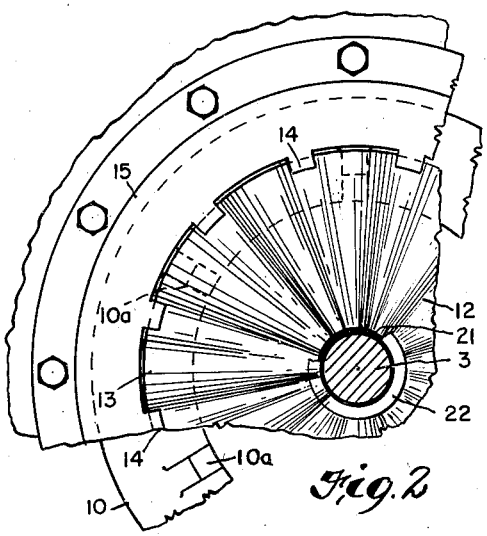
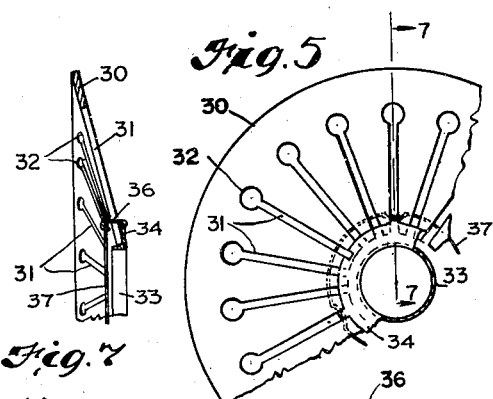
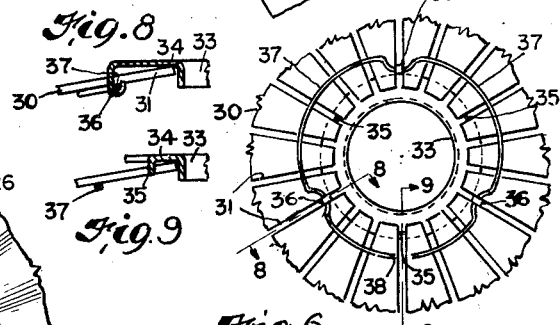
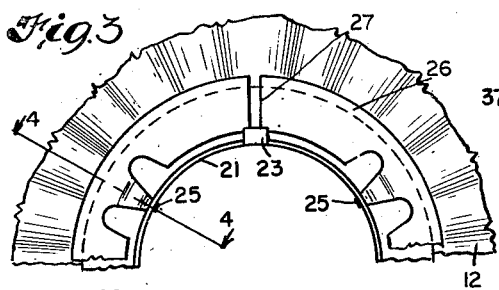
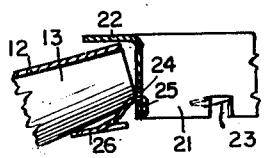
INVENTOR.
IRA SAKS
BY Oberlin & Limbach
ATTORNEYS Patented July 20, 1948

2,445,638

UNITED STATES PATENT OFFICE 2,445,638

FRICTION CLUTCH

Ira Saks, Shaker Heights, Ohio

Application November 3, 1944, Serial No. 561,677

4 Claims. (Cl. 267—1)

The present improvements, relating as indicated to friction clutches, have more particular regard to improvements in clutches such as are employed in automotive transmissions and the like wherein one of the elements is a spring of the so-called Belleville washer type. However, the invention is not necessarily limited to such specific application.

One object of the invention is to provide an improved and simplified form of connection between the lever for actuating the clutch and such spring element. A further object is to provide such connecting means which will be more durable in service than constructions at present available and which at the same time may be capable of ready removal and exchange in case because of wear or for other reason replacement should be found desirable.

As utilized in clutches, the Belleville type spring is in the form of an annular plate having radial corrugations that extend from the central opening therein to its periphery, such corrugations becoming deeper as they approach the outer circumference of the plate, so that the latter in its general aspect resembles the frustum of a cone. Where such a spring element is utilized in a clutch, the pressure of the throw-out bearing on the inner ends of the corrugations at the central openings of the spring or washer tends to wear down the latter, and conversely, the inner ends of such corrugations subject the throw-out bearing to undue wear. A further object of the invention is to provide an inexpensive readily replaceable element which will take up such wear and thus avoid discarding essential parts of the clutch mechanism when reconditioning the latter.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a central axial section through a friction clutch embodying my present improvements;

Fig. 2 is a broken elevational view of the main portion of such clutch as viewed from the right in Fig. 1;

Fig. 3 is a broken elevational view on a larger scale of the parts shown in Fig. 2, as viewed in the opposite direction;

Fig. 4 is a transverse section of said parts, the plane of the section being indicated by the radial line 4—4, Fig. 3;

Fig. 5 is a view similar to that of Fig. 2, but showing a spring of modified construction;

Fig. 6 is a view on a somewhat larger scale of the parts shown in Fig. 5 and as viewed from the opposite side;

Fig. 7 is a transverse section of such modified construction as indicated by the radial line 7—7 on Fig. 5; and Figs. 8 and 9 are sectional views of the same, but on the larger scale of Fig. 6, the planes of such sections being indicated by the lines 8—8 and 9—9 on said Fig. 6.

Referring to Fig. 1, which most completely illustrates my present improved construction of clutch, the latter is enclosed as usual in a housing 1 into which there enters from one side a driving shaft 2 and from the other a driven shaft 3. Where the clutch is used in an automotive vehicle, such driving shaft will of course comprise one end of the engine crankshaft, while the driven shaft will be the adjacent end of the transmission shaft, the latter being held in alignment with the former by having its end reduced and fitted into a bearing 4 in the end of the driving shaft.

Fixedly attached to the end of such driving shaft is the usual flywheel 5, while splined on the adjacent end of the driven shaft, through the medium of a hub 6 and conventional cushioning device 7, is a plate 8. This plate carries annular frictional facings 9 respectively adapted to contact with the adjacent face of the flywheel and with the opposed face of a pressure plate 10 which is supported and adapted to be actuated by means of spring 12. The latter in the form illustrated in Figs. 1 to 4, inc., is of the Belleville washer type and comprises in effect a slightly dished annular plate formed with a series of radial corrugations 13 that extend from the central opening therein to its periphery. These corrugations, as shown in Fig. 1, gradually become deeper and broader as they approach the outer circumference of the plate, and the latter is generally positioned in relaiton to the previously described parts by means of a series of circumferentially spaced radially inwardly extending fingers 14 on a flange 15 attached to flywheel 5 outside the area of contact of the driven plate 8 therewith. Circumferentially spaced axial projections 10a on pressure plate 10, which are disposed to engage oppositely directed corrugations 13, further assist in thus retaining spring 12 in place.

The construction of the clutch thus far described is well known, as are also the means (not shown) whereby pressure plate 10 is normally moved out of engagement with the driven plate 8. The improvements of present interest have to do with the means for applying pressure to the central portion of the spring member 12, and through the latter to such pressure plate 10 in order to frictionally grip the plate 8 between such pressure plate and the flywheel and thus transmit power from driving shaft 2 to driven shaft 3.

Such clutch operating means comprise a conventional lever 16, oscillatory at a point intermediate its ends on a fulcrum 17 provided within casing 1. The inner end of said lever is forked to engage outwardly projecting pins 18 on a ring 19 of suitable bearing material that surrounds and is held against longitudinal movement on a flanged collar 20, which is in turn freely movable on the driven shaft 3 adjacent the spring 12.

Referring more particularly to Figs. 3 and 4, it will be seen that the central opening in such spring 12 is provided with a close fitting cylindrical ring 21. The outwardly directed edge of this ring is provided with a flange 22 adapted to bear against the adjacent side of collar 20 on driven shaft 3. Both such ring and collar will desirably be made of steel designed to stand up under the frictional wear to which their contacting faces are subjected. In order to retain ring 20 against rotative movement within the opening in spring 12 to which it is thus fitted, the opposite edge of said ring is provided with a series of outwardly directed lugs 23 struck up from the material of the ring, such lugs being disposed to interlock with the adjacent inner ends of corresponding corrugations 13. In order to retain said ring 21 against longitudinal displacement it is provided with a plurality of circumferentially spaced openings 24 wherewith inwardly directed hooks 25 on a locking ring 26 are adapted to engage.

This ring, which is made of flat spring steel, is split at one point 27 in its circumference so as to permit it to be contracted in order to engage the hooks 25 with the openings 24 and to be expanded when it is desired to disengage such hooks. By the means just described the ring 21 with the bearing flange 22 may be readily assembled on or disassembled from the spring 12.

In the construction illustrated in Figs. 5 to 9 inc., instead of employing a disc-shaped spring member 12 with radial corrugations to provide an operative connection between collar 20 and pressure plate 10, another form of disc spring 30 is utilized. This, as best shown in Figs. 5 and 7, is slightly dished, as in the case of said spring 12, and is formed with a series of radial slots 31 which extend outwardly from the central opening in the disc to circular apertures 32 adjacent the periphery of the disc. A ring 33, formed with a bearing flange 34 that corresponds in location and function with flange 22 in the first described construction, is secured in the central opening in such spring member 30, being held against rotative movement relatively to the latter by two series of inwardly directed lugs 35 and 36 stamped up from the periphery of flange 33. Lugs 36 (see Figs. 8 and 9) are somewhat longer than lugs 35 and are recurved to form hooks adapted to be engaged by a resilient split ring 37, much as ring 26 engages with the apertures 24 in ring 21. As shown (Fig. 6), this modified retaining ring 37 may consist simply of a circular piece of spring wire, which as first indicated is split at point 38. In order to facilitate its engagement with hooks 36 it is slightly indented at corresponding points.

From the foregoing description it will be evident that the ring 33 with its bearing flange 34 may be attached to or detached from the spring member 30 just as readily in its modified construction as the corresponding ring with its bearing flange in the first described construction. In both constructions the spring member, including the bearing element in question, is entirely separate from the collar 20 through which the spring is actuated by rocking the lever 16. It is accordingly unnecessary to disassemble such lever and collar in order to replace the spring member, should this for any reason become necessary, and in particular in case the bearing element on said spring member should require replacement this is readily effected by simply replacing the ring 21 in the case of the first described construction or the ring 33 in the case of the second.

It will be seen that by inserting a collar in the manner hereinbefore described in the central opening in the spring plate, whether the latter be of the Belleville washer type or of the modified construction illustrated in the drawing, a flat wearing surface is opposed to the throw-out bearing against which the latter is applied instead of the sharp edges at such central opening, which are particularly accentuated where the plate is corrugated and the corrugations extend into such opening. In other words, by providing such a wear-collar in this opening both the plate or spring member is protected against undue wear and equally so the throw-out bearing. Furthermore, in case the collar becomes unduly worn, it may be readily replaced, and upon small expense compared with a replacement of the spring member and throw-out bearing. By simply inserting a new wear collar, the clutch could be reconditioned for further service.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination of a resilient member of the Belleville washer type for use in a clutch as described, a bearing ring non-rotatably fitted in the central opening in said member and formed with a radially projecting flange on its one edge providing an outwardly facing bearing, and a retaining ring secured to said bearing ring for retaining the latter against axial displacement in such opening, said rings being provided with overlapped portions positively securing them against radial movement relative to one another.

2. The combination of a resilient member of the Belleville washer type for use in a clutch as described, a bearing ring non-rotatably fitted in the central opening in said member and formed with a radially projecting flange on its one edge providing an outwardly facing bearing, and a split, resilient ring secured to said bearing ring for retaining the latter against axial displacement in such opening, said rings being provided with overlapped portions positively securing them against radial movement relative to one another.

3. The combination of a resilient member of the Belleville washer type for use in a clutch as described, a bearing ring non-rotatably fitted in the central opening in said member and formed with a radially projecting flange on its one edge providing an outwardly facing bearing and with openings on its other edge, and a split, resilient ring having hooks engaged in such openings of said bearing ring for retaining the latter against axial displacement in such opening.

4. The combination of a resilient member of the Belleville washer type for use in a clutch as described, a bearing ring non-rotatably fitted in the central opening in said member and formed with a radially projecting flange on its one edge providing an outwardly facing bearing, hooked lugs on said ring projected through said member, and a split resilient ring engaged in said hooked lugs to retain said bearing ring against axial displacement in such opening.

IRA SAKS.

REFERENCES CITED

The following references are of record in the file of this patent:

UNITED STATES PATENTS

| Number | Name | Date |
|---|---|---|
| 1,750,257 | Bonnell | Mar. 11, 1930 |
| 2,100,464 | Almen et al. | Nov. 30, 1937 |
| 2,169,757 | Becker | Aug. 15, 1939 |
| 2,188,596 | Hobert | Jan. 30, 1940 |
| 2,356,310 | Gass | Aug. 22, 1944 |